(12) United States Patent
Carr

(10) Patent No.: US 9,730,545 B2
(45) Date of Patent: Aug. 15, 2017

(54) BABY FORMULA PREPARATION DEVICE

(71) Applicant: Kayonna Carr, Sicklerville, NJ (US)

(72) Inventor: Kayonna Carr, Sicklerville, NJ (US)

(*) Notice: Subject to any disclaimer, the term of this patent is extended or adjusted under 35 U.S.C. 154(b) by 4 days.

(21) Appl. No.: 15/046,217

(22) Filed: Feb. 17, 2016

(65) Prior Publication Data

US 2016/0235241 A1   Aug. 18, 2016

Related U.S. Application Data

(60) Provisional application No. 62/117,832, filed on Feb. 18, 2015.

(51) Int. Cl.
*A47J 31/40*     (2006.01)
*H05B 3/78*      (2006.01)

(52) U.S. Cl.
CPC ............. *A47J 31/401* (2013.01); *H05B 3/78* (2013.01)

(58) Field of Classification Search
CPC .................................. A47J 31/401; H05B 3/78
See application file for complete search history.

(56) References Cited

U.S. PATENT DOCUMENTS

| | | | |
|---|---|---|---|
| 6,193,109 B1 | 2/2001 | Credle, Jr. et al. | |
| 6,411,777 B2 | 6/2002 | Roberson | |
| 6,412,527 B1 | 7/2002 | Brice | |
| 6,766,106 B2* | 7/2004 | Roberson | A47J 31/41 222/146.5 |
| 6,829,431 B1 | 12/2004 | Haven et al. | |
| 6,951,166 B1 | 10/2005 | Sickels | |
| 7,398,725 B2 | 7/2008 | Rebordosa et al. | |
| 7,398,726 B2 | 7/2008 | Streeter et al. | |
| 8,167,006 B1* | 5/2012 | Mathis | A47J 31/401 141/247 |
| 8,210,099 B2* | 7/2012 | Kang | A47J 31/401 222/146.1 |
| 8,261,944 B2 | 9/2012 | Krause et al. | |
| 8,360,279 B1* | 1/2013 | Giles | A47J 31/401 141/256 |
| 8,512,784 B2 | 8/2013 | Denisart et al. | |
| 8,601,938 B2* | 12/2013 | Huber | A47J 31/404 99/289 R |
| 8,809,745 B1* | 8/2014 | Scarberelli | A47J 36/2438 219/436 |
| 8,950,316 B2 | 2/2015 | Sinnema et al. | |

(Continued)

*Primary Examiner* — Frederick C Nicolas
*Assistant Examiner* — Bob Zadeh
(74) *Attorney, Agent, or Firm* — Kim Winston LLP

(57) ABSTRACT

A baby formula preparation device including a reservoir assembly, a mixing chamber, a dispensing area, a heating chamber and a control unit operably connected to the reservoir assembly, mixing chamber, dispensing area and heating chamber is provided. The reservoir assembly includes a dry powder reservoir, a water reservoir, a heating element, a dry powder metering device and a water metering device. The mixing chamber is operatively in communication with the dry powder reservoir and water reservoir for mixing a predetermined quantity of dry powder and a predetermined quantity of heated water together to form formula mixture. The mixing chamber further includes a nozzle for dispensing the formula mixture into a baby bottle. The baby formula preparation device further includes a heating chamber for heating a food container.

10 Claims, 5 Drawing Sheets

(56) References Cited

U.S. PATENT DOCUMENTS

2007/0280657 A1* 12/2007 Loia .................. A47J 36/2433
                                                        392/442
2008/0022765 A1   1/2008 Witt et al.
2016/0235241 A1*  8/2016 Carr ..................... H05B 3/78

* cited by examiner

BABY FORMULA PREPARATION DEVICE

CROSS REFERENCE TO RELATED APPLICATIONS

The present application claims the benefit of U.S. Provisional Patent Application No. 62/117,832 filed Feb. 18, 2015 entitled "BABY DON'T CRY," the entire disclosure of which is hereby incorporated by reference herein for all purposes.

BACKGROUND OF THE INVENTION

The present invention relates generally to the field of infant formulas for bottles. In particular, the present invention relates to the field of baby formula preparation appliances for assisting users in preparing formula mixture for a baby's bottle from powdered formula.

For most parents of babies or toddlers, a baby bottle is a mandatory item, day and night. Baby bottles are used to provide nourishing milk or formula to an infant and help to soothe and comfort a baby, especially in times of colic and fussiness. A baby bottle also is used by most nursing mothers as a nutritional supplement and as a means for feeding their child when traveling or when in public. A bottle of warm formula is essential for healthy and happy children, from the time of birth when providing their sole means of nourishment until toddler years when providing nutritional accompaniment to solid foods or a nighttime snack.

Parents with bottle fed babies often utilize prepackaged infant formulas when feeding their child. Prepackaged infant formulas provide necessary vitamins and minerals for an infant. Prepackaged infant formulas are manufactured in an endless variety of formulations to enable a parent to plan their child's diet to best suit their individual needs. A parent whose child is allergic to milk may utilize a soy based infant formula while a parent with an anemic child may use a formula with an iron supplement. Prepackaged infant formulas are produced in ready to use or concentrated versions. Preparing a baby bottle at times becomes a hassle, especially if a baby cries in the middle of the night. The parent wakes from slumber, measures out the proper amount of formula and then warms the bottle for the infant. Many parents find that the number of bottles consumed by their child throughout the day means that they are either constantly preparing baby bottles or spending a great deal of time in the morning preparing an entire batch of bottles to sustain a child during the day.

As such, the process of mixing, dispensing and heating infant formula can be cumbersome, tedious and time consuming for parents, caregivers and professional daycare providers.

BRIEF SUMMARY OF THE INVENTION

In accordance with a preferred embodiment, the present invention provides a baby formula preparation device configured to automatically dispense formula mixture. The baby formula preparation device comprises a reservoir assembly, a mixing chamber, a dispensing area, a heating chamber and a control unit operably connected to the reservoir assembly, mixing chamber and heating chamber. The reservoir assembly includes a dry powder reservoir for holding baby formula, a water reservoir, a heating element for heating water within the water reservoir, a dry powder metering device connected to the dry powder reservoir for supplying a predetermined quantity of dry powder, and a water metering device connected to the water reservoir for supplying a predetermined quantity of heated water based on the predetermined quantity of dry powder.

The mixing chamber is operatively in communication with the dry powder reservoir and water reservoir for mixing the predetermined quantity of dry powder and the predetermined quantity of heated water together to form the formula mixture. The mixing chamber further includes a nozzle for dispensing the formula mixture into a baby bottle. The dispensing area for receiving the baby bottle is adjacent to and below the mixing chamber. Further, the heating chamber for heating a food container is adjacent the dispensing area.

The present invention provides a portable appliance specifically to prepare baby bottles. The invention provides busy parents a simple and expeditious means of providing their child a warm and nutritious bottle of formula, thus sparing them the time consuming and tedious process of preparing such bottles manually. The baby formula preparation device dispenses premeasured infant formula, mixes the formula with warm water heated to an optimal serving temperature and pours the mixture directly into a child's baby bottle. The baby formula preparation device produces a perfect liquid blend that is free of bubbles and is programmable to mix a single bottle at a time or prepare several bottles in one session.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Figure 1:
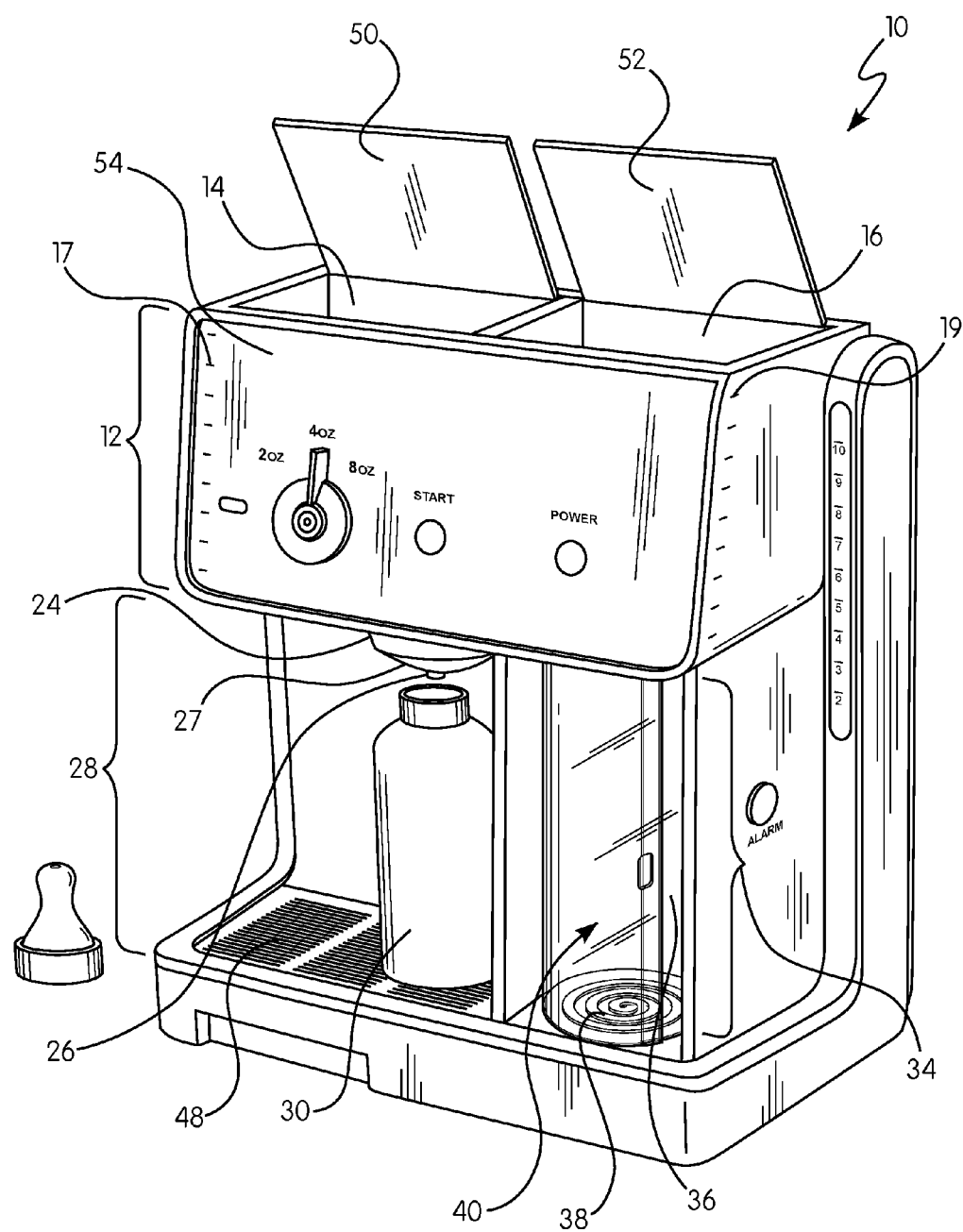
FIG. 1 is a front perspective view of a baby formula preparation device in accordance with a preferred embodiment of the present invention.
Figure 2:
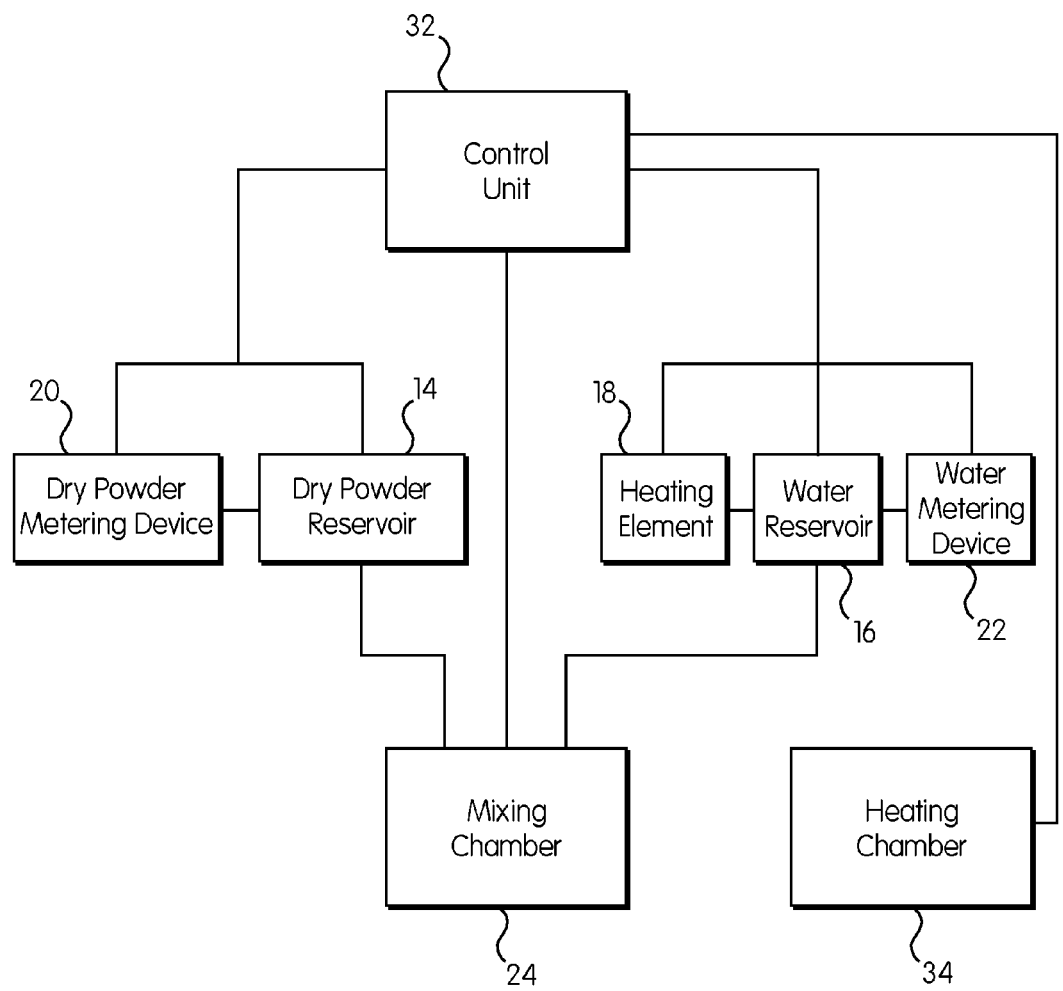
FIG. 2 is a schematic diagram of the baby formula preparation device of FIG. 1.
Figure 3:
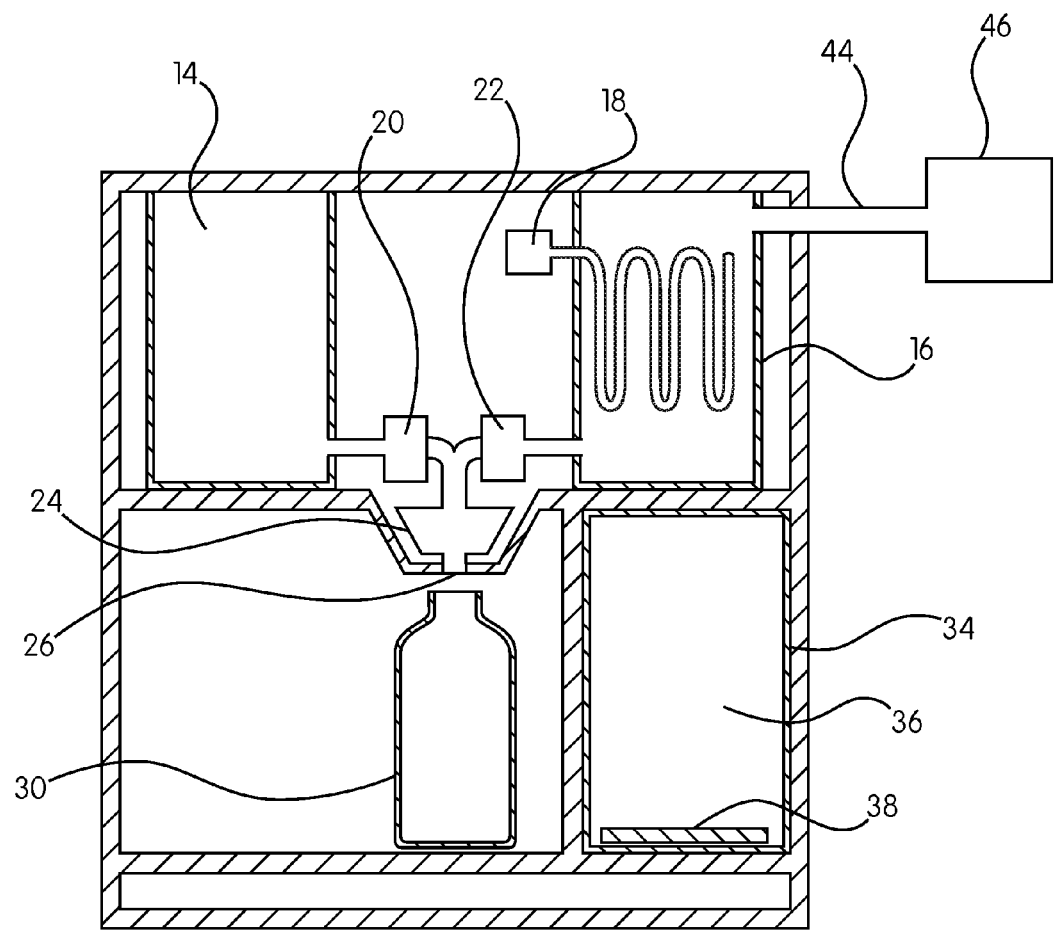
FIG. 3 is a simplified cross-sectional view of the baby formula preparation device of FIG. 1.

In accordance with a preferred embodiment, the present invention provides a baby formula preparation device 10 as configured in FIGS. 1-3 and includes a reservoir assembly 12, a mixing chamber 24, a dispensing area 28, a heating chamber 34 and a control unit 32.

The reservoir assembly 12 includes a dry powder reservoir 14 for holding baby formula, a water reservoir 16, a heating element 18 for heating water within the water reservoir 16, a dry powder metering device 20 connected to the dry powder reservoir 14 for supplying a predetermined quantity of dry powder, and a water metering device 22 connected to the water reservoir 16 for supplying a predetermined quantity of heated water based on the predetermined quantity of dry powder.

The reservoir assembly 12 is configured as a housing with an interior space to house the above mentioned components, as further described below. The reservoir assembly 12 includes a bottom wall and side walls, extending from the bottom wall. Similarly, a rear wall and a front wall each extend from the bottom wall. The reservoir assembly 12 further includes a top wall that extends between the side walls and rearwardly from the front wall substantially parallel to the bottom wall. The top wall includes a pair of openable lids 50, 52 for providing access to the dry powder reservoir 14 and water reservoir 16.

The bottom wall is preferably rectangular in shape, but can alternatively be configured as any other suitable shape e.g., square, round, octagon, trapezoidal and the like. When the bottom wall is configured to have a shape other than a square or rectangular shape, e.g., round, octagonal or trapezoidal, the other walls of the reservoir assembly 12 are correspondingly configured to form the housing.

The walls of the reservoir assembly 12 can be formed from any suitable material, such as shatterproof plastic, stainless steel or any metal casing. Alternatively, the front wall of the reservoir assembly 12 can be formed from a transparent material for allowing a user to see the remaining amounts of dry powder and water within the respective reservoirs 14,16. The reservoir assembly 12 serves generally to house and protect the dry powder reservoir 14, water reservoir 16, heating element 18, dry powder metering device 20 and water metering device 22. As previously discussed, the openable lids 50, 52 provide access to the dry powder reservoir 16 and water reservoir 16.

The dry powder reservoir 14 is positioned in the interior space of the reservoir assembly 12 and holds a quantity of dry powder baby formula. Dry powder baby formula can be poured into the dry powder reservoir 14 via the openable lid 50. In accordance with an aspect of the present embodiment, the dry powder reservoir 14 can be formed of a translucent or transparent material, through which the amount of dry powder baby formula remaining can be viewed by a user. Additionally, measuring or graduation marks 17 can be located on the translucent or transparent portion to identify the specific quantity of dry powder baby formula remaining.

As best shown in FIGS. 1-3, the water reservoir 16 is positioned adjacent the dry powder reservoir 14 in the interior space of the reservoir assembly 12. The water reservoir 16 holds a quantity of fresh or distilled water. Water can be poured into the water reservoir 16 via the openable lid 52. Alternatively, water can be supplied to the water reservoir 16 by a water supply line 44 coupled to the water reservoir 16 for connection to an external water supply 46 e.g., a household water supply, a water tank and the like. Similar to the dry powder reservoir 14, the water reservoir 16 can be formed of a translucent or transparent material, through which the amount of water remaining can be viewed by a user. Additionally, measuring or graduation marks 19 can be located on the translucent or transparent portion to identify the specific quantity of water remaining.

Referring now to FIG. 3, the water reservoir 16 further includes a heating element 18 for heating water within the water reservoir 16. Specifically, the heating element 18 is located in or adjacent the water reservoir 16 and in fluid or thermal contact with the water reservoir 16. The heating element 18 can be configured as a coiled heating element shaped and sized to heat the quantity of water within the water reservoir 16. The heating element 18 is operably connected to the control unit 32 and provides a controlled amount of heat to heat the water inside the water reservoir 16 in accordance with a temperature set by the user. The heating element 18 serves to maintain a desired temperature within the water reservoir 16. The heating element 18 can alternatively be any other suitable water heater known in the art, e.g., heating rod, heat exchanger, heating plate and the like.

As best shown in FIGS. 2 and 3, the dry powder reservoir 14 and water reservoir 16 include respective metering devices 20, 22 for supplying a predetermined quantity of dry powder and heated water to the mixing chamber 24. The dry powder metering device 20 is operably connected to a bottom portion of the dry powder reservoir 14. The dry powder metering device 20 provides a predetermined quantity of dry powder to the mixing chamber 24. Similarly, the water metering device 22 is operably connected to a bottom portion of the water reservoir 16. The water metering device 22 provides a predetermined quantity of heated water to the mixing chamber 24. The dry powder metering device 20 and water metering device 22 are known in the art and therefore a detailed description of their structure, function and operation is not necessary for a complete understanding of the present invention. However, metering devices applicable to the present invention are disclosed, e.g., in U.S. Pat. Nos. 7,398,726; 7,398,725; and 6,829,431, the entire disclosures of which are incorporated by reference herein for all purposes. However, in each configuration, the dry powder metering device 20 and water metering device 22 are operably connected to the control unit 32.

As previously discussed, the dry powder metering device 20 provides a predetermined quantity of dry powder to the mixing chamber 24 in accordance with a desired amount of formula mixture. The control unit 32 automatically performs a sequence of steps for providing the mixing chamber 24 with a proper amount of dry powder and heated water. Specifically, the control unit 32 is operably connected to the dry powder metering device 20, and configured to select a predetermined quantity of dry powder for the mixing chamber 24 in accordance with the user's parameters. Based on the predetermined quantity of dry powder, the control unit 32 is configured to determine a quantity of heated water required to prepare the formula mixture. Similarly, the control unit 32 is operably connected to the water metering device 22, and configured to provide the determined quantity of heated water to the mixing chamber 24 for mixing with the predetermined quantity of dry powder. In sum, the predetermined quantity of heated water supplied to the mixing chamber 24 is based on the predetermined quantity of dry powder supplied to the mixing chamber 24 to ensure a proper blend of formula mixture. In another aspect of the preferred embodiment, the control unit 32 is operably connected to the dry powder metering device 20 and the water metering device 22, and configured to determine and supply a quantity of dry powder based on a size of the baby bottle selected by the user. Afterwards, the control unit 32 is configured to supply a quantity of heated water based on the determined quantity of dry powder.

As best shown in FIG. 3, the mixing chamber 24 is positioned subjacent the dry powder metering device 20 and water metering device 22 of the reservoir assembly 12. The mixing chamber 24 is operatively in communication with the dry powder reservoir 24 and the water reservoir 16 for mixing the predetermined quantity of dry powder and the predetermined quantity of heated water together to form a formula mixture. The mixing chamber 24 is also operably connected to the control unit 32 and configured to receive and mix the predetermined quantity of dry powder and predetermined quantity of heated water. The mixing chamber 24 is sized and configured to hold a volume of formula mixture. Preferably, the volume of the mixing chamber 24 corresponds to a volume of different baby bottles, i.e. 2 oz., 4 oz., 6 oz., 8 oz., 10 oz. and the like.

In an aspect of the preferred embodiment, the volume of the mixing chamber 24 can be smaller than a volume of the baby bottle. Specifically, the mixing chamber 24 can be configured to receive a fixed amount or fixed flow rate of dry powder from the dry powder reservoir 14. Based on the fixed amount or fixed flow rate of dry powder received within the mixing chamber 24, the control unit 32 determines and supplies a proper amount or flow rate of heated water to be mixed with the dry powder. As such, heated water is continuously flowed through the mixing chamber 24 and mixed with the received dry powder in a continuous process. Preferably, a flow of dry powder is continuously mixed with a flow of heated water. For example, a flow of X grams/s of dry powder mixes with a flow of Y grams/s of heated water.

In other words, the control unit 32 directs the dry powder metering device 20 and water metering device 22 to supply fixed flow rates of dry powder and heated water to the mixing chamber 24 from the dry powder reservoir 14 and water reservoir 16. Metering devices configured to supply a fixed flow rate of materials applicable to the present invention are disclosed, e.g., in U.S. Pat. Nos. 6,193,109 and 8,512,784 and U.S. Patent App. Pub. No. 2008/0022765, the entire disclosures of which are incorporated by reference herein for all purposes.

The mixing chamber 24 mixes the predetermined quantity of dry powder and the predetermined quantity of heated water in a conventional, well-known manner in the art. For example, the mixing chamber 24 can include a mixer having a mixing motor and a shaft-driven mixing implement. The shaft-driven mixing implement is configured to mix the predetermined quantity of dry powder and the predetermined quantity of heated water. Alternatively, the mixing chamber 24 can further include a mixing blade or a whipper mechanism for mixing the contents of the mixing chamber 24. The mixer is not limited to the arrangements described above and may include any known arrangement for mixing the predetermined quantity of dry powder and the predetermined quantity of heated water.

Referring back to FIG. 1, the mixing chamber 24 further includes a nozzle 26 for dispensing the formula mixture into a baby bottle 30. Specifically, the nozzle 26 is positioned about an upper portion of the dispensing area 28. After the dry powder and heated water are mixed in the mixing chamber 24, the formula mixture is dispensed through the nozzle 26 into the baby bottle 30 located in the dispensing area 28. The nozzle 26 optionally includes a filter 27 for preventing clumps of formula mixture from being dispensed into the baby bottle 30.

As best shown in FIGS. 1 and 3, the dispensing area 28 is adjacent to the mixing chamber 24. As shown, the dispensing area 28 is a recessed compartment configured to receive the baby bottle 30. The baby bottle 30 is positioned in the dispensing area 28 and below the nozzle 26 of the mixing chamber 24. The dispensing area 28 can include a drip tray 48 for catching any overflow of formula mixture from dispensing the formula mixture into the baby bottle 30. The drip tray 48 is configured as a substantially planar member with ridged openings allowing liquid to pass through into a compartment. In an aspect of the present embodiment, the drip tray 48 is removable, thereby facilitating cleanup after preparation of formula mixture.

Figure 5:
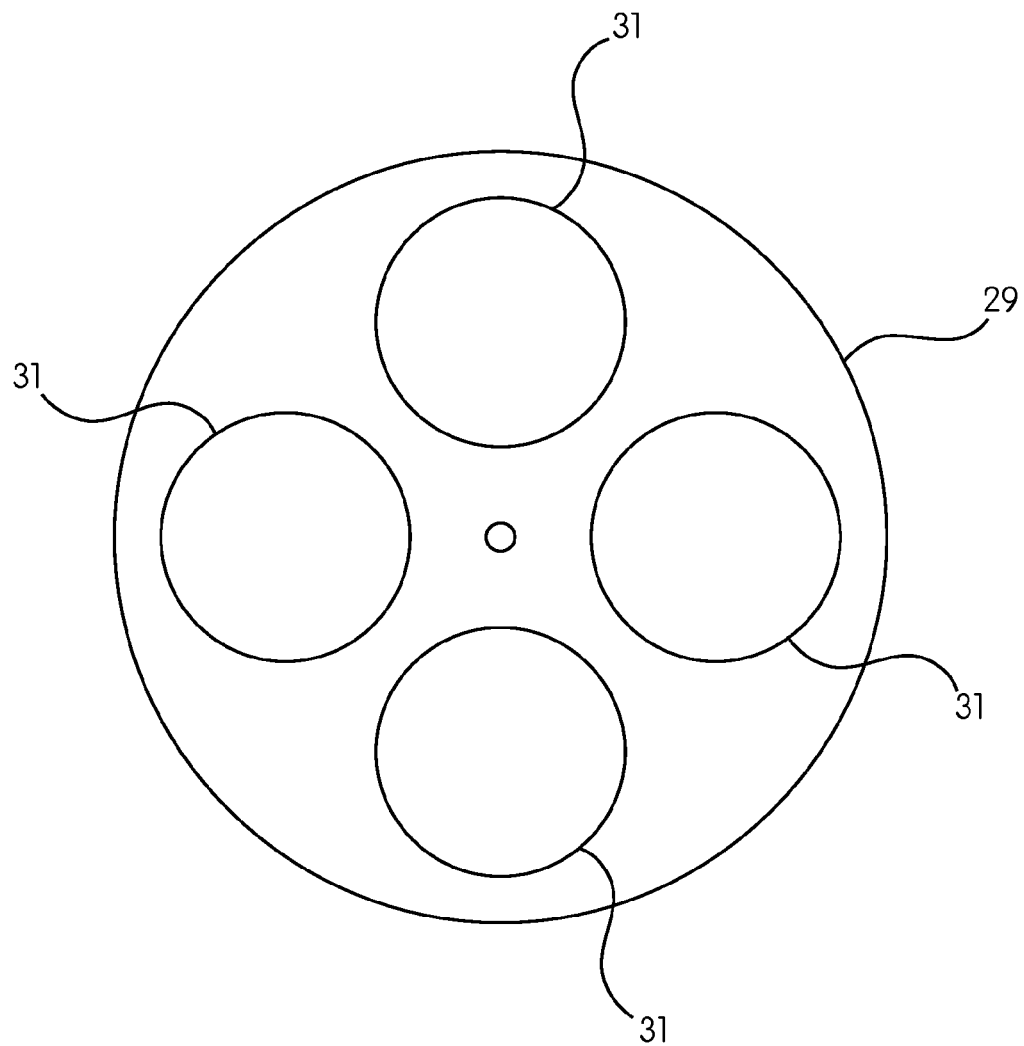
FIG. 5 is a simplified top plan view of a rotating platform applicable to an aspect of a dispensing area of the baby formula preparation device of FIG. 1.

Alternatively, FIG. 5 illustrates a rotating platform 29 or comparable mechanism applicable to the dispensing area 28 of the present invention for preparing multiple baby bottles in sequence. Specifically, the rotating platform 29 is configured to position an empty baby bottle below the nozzle 26 until filled and then rotated to position another empty bottle below the nozzle 26. The rotating platform 29 moves such that multiple baby bottles are fillable in succession with formula mixture dispensed from the nozzle 26. The rotating platform 29 can optionally include a plurality of slots 31 for receiving and securing multiple baby bottles in place on the rotating platform 29.

FIGS. 1-3 illustrate the heating chamber 34 adjacent the dispensing area 28 for heating a food container. In accordance with an aspect of the present embodiment, the heating chamber 34 includes a heating cavity 36, a heating plate 38 and a door 40 moveable between an open position for accessing the heating chamber 34 and a closed position for closing the heating chamber 34. In an aspect, the door 40 can be formed of a translucent or transparent material, through which the food container can be viewed by a user, similar to a microwave. The door 40 is moveable between an open position for accessing the heating chamber 34 and a closed position for closing the heating chamber 34. The heating cavity 36 has walls formed by the adjacently positioned reservoir assembly 12 and dispensing area 28. Specifically, the heating cavity 36 includes a bottom wall and side walls, extending from the bottom wall. Similarly, a rear wall extends from the bottom wall. The heating cavity 36 further includes a top wall formed by the bottom wall of the reservoir assembly 12. A front face of the heating cavity 36 is sealable by the door 40. The heating cavity 36 is adapted to receive the food container. The bottom wall is preferably square in shape, but can alternatively be configured as any other shape suitable for receiving a food container, e.g., rectangular, round, octagon, trapezoidal and the like. When the bottom wall is configured to have a shape other than a square or rectangular shape, the other walls of the heating cavity 36 are correspondingly configured to form the heating cavity 36.

As best shown in FIG. 1, the heating plate 38 is preferably configured as a coiled hot plate for heating a baby bottle or food container. The heating plate 38 is shaped and sized to support a standard baby bottle or food container placed inside the heating chamber 34. The heating plate 38 provides a controlled amount of heat to a food container to heat its contents in accordance with a temperature set by the user.

The heating plate 38 serves to maintain a desired temperature for a specified amount of time. The heating plate 38 is well known in the art and therefore a detailed description of its structure, function and operation is not necessary for a complete understanding of the present invention. The heating plate 38 can alternatively be any other suitable heating element known in the art.

Alternatively expressed, the heating chamber 34 includes a heating cavity 36 adapted to receive a food container and a heating apparatus 38 for heating the heating cavity 36. The heating apparatus 38 provides a controlled amount of heat to a food container to heat its contents in accordance with a temperature set by the user.

Figure 4:
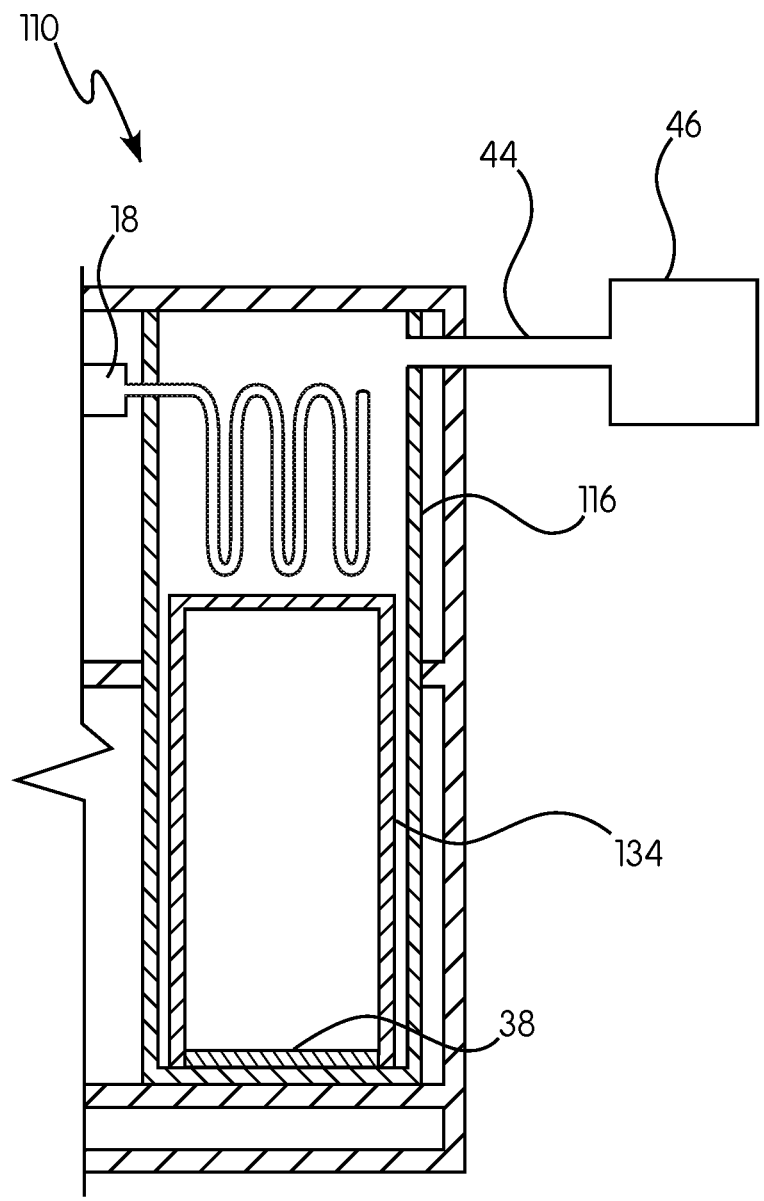
FIG. 4 is a simplified cross-sectional view of another aspect of a heating chamber of the baby formula preparation device of FIG. 1.

Referring to FIG. 4, in accordance with another aspect, the present invention provides a baby formula preparation device 110 that includes a heating chamber 134 heated by heated water from the water reservoir 116. The water reservoir 116 surrounds the heating chamber 134 and is configured as a water bath. As discussed previously, the heating element 18 located in the water reservoir 116 is configured as a coiled heating element and provides a controlled amount of heat to heat the water inside the water reservoir 116. As such, the heated water in the water reservoir 116 surrounding the heating chamber 134 serves to heat the heating chamber 134 and subsequently heats a food container inside the heating chamber 134.

Referring back to FIG. 2, a schematic diagram of the baby formula preparation device 10 is illustrated. The control unit 32 is operably connected to the components of the reservoir assembly 12 including the dry powder reservoir 14, dry powder metering device 20, water reservoir 16, water metering device 22 and heating element 18. Additionally, the control unit 32 is operably connected to the mixing chamber 24 and the heating chamber 34. The control unit 32 includes a processor and a memory having stored thereon a set of instructions that, when executed by a processor, cause the baby formula preparation device to prepare formula mixture in accordance with parameters set by the user. The control unit 32 is configured to automatically dispense the formula mixture into the baby bottle.

The control unit 32 is configured to determine and supply a quantity of heated water and a quantity of dry powder to the mixing chamber 24. That is, the user selects the size of the baby bottle and the control unit 32 determines the quantity of dry powder necessary for the selected bottle size. Afterwards, the control unit 32 determines and supplies a quantity of heated water based on the determined quantity of dry powder. Alternatively, the user determines the quantity of dry powder and the control unit 32 determines the quantity of heated water based on the quantity of dry powder. The control unit 32 is also configured to determine optimum flow rates of dry powder and heated water supplied to the mixing chamber 24 based on the size of the baby bottle selected by the user.

The baby formula preparation device is configured to allow the user to prepare a wide variety of different baby formula mixtures, compositions and brands. Different baby formula mixtures can each have varying ratios of dry powder to heated water based on the size of the baby bottle. As such, the control unit 32 can be programmed and calibrated by a user to prepare formula mixture compositions that require varying amounts of ingredients. Thus, the control unit 32 can supply a specific quantity of dry powder and heated water in accordance with a ratio corresponding to the type of formula mixture and baby bottle size selected by the user.

In an aspect of the present embodiment, a control panel 54 is positioned on a front face of the baby formula preparation device and operably connected to the control unit 32. The control panel 54 allows a user to program the number and size of baby bottles to be prepared. The control panel 54 also allows the user to program the control unit 32 with different ratios of ingredients corresponding to different formula mixtures. For example, the user selects the type of formula and the number and size of baby bottles to be prepared. In order to prepare a desired number of servings, the control unit 32 is configured to automatically provide a specific quantity of dry powder and heated water to the mixing chamber 24 based on the programmed ratio of the formula mixture. In other words, the control unit 32 automatically adjusts the specific quantity of dry powder and heated water provided based on the desired number of servings. Thus, the baby formula preparation device 10 allows a user to prepare different formula mixtures of varying serving size without having to manually measure and mix ingredients. The baby formula preparation device 10 optionally includes a temperature selection switch enabling a user to specify a temperature to prepare the formula mixture and heat the food container.

Preferably, the baby formula preparation device is placed in an appropriate area of the home such as a kitchen or child's nursery. The present invention operates on conventional 110V electricity. In use, the user places one or more open baby bottles in the dispensing area of the present invention. The user fills the water reservoir and dry powder reservoir with water and dry powder in accordance with a desired type of formula mixture to be prepared. The user utilizes the control panel to prepare a baby bottle at a future time such as when a child normally awakens for feeding. Alternatively, the user may program the present invention to prepare several bottles to meet a child's needs throughout the day.

After setting a desired temperature and specifying a desired amount of formula mixture, the user activates the present invention with a start button on the control panel. In other words, the user selects the baby bottle size or a quantity of formula mixture to make. The water in the water reservoir is heated via the heating element to a predetermined temperature as indicated by the user. Based on the user's selection of baby bottle size and desired amount of formula mixture, a quantity of dry powder and quantity of heated water are supplied to the mixing chamber for mixing and blending. After mixing, the formula mixture is dispensed through the nozzle into an open baby bottle in the dispensing area. After completion, the user can remove the prepared baby bottle, apply a nipple and threaded collar to the top of the baby bottle, and present the baby bottle to the child. Remaining bottles can be capped and stored in a refrigerator until needed. When removed for later use, the user can utilize the heating chamber to heat the contents of the baby bottle to a desired temperature. Alternatively, the prepared baby bottle can be automatically moved to the heating chamber by a conveyor belt, rotating platform or comparable mechanism. The components of the present invention are removable, dishwasher safe components that facilitate easy maintenance of the present invention.

In sum, the present invention provides a baby formula preparation device that takes up little counter space. The baby formula preparation device according to the present invention measures, warms and blends formula for a baby bottle, thereby providing a soothing and nutritious bottle in an efficient manner. Loadable ahead of time, the present invention allows a user to prepare a baby bottle without having to manually measure and mix ingredients. As such, the present invention reduces the complexity associated with mixing powdered formulas manually, thereby providing reliable formula preparation. The present invention provides an efficient and convenient appliance for preparing baby formula and reduces the burden on parents, caregivers and professional day care providers.

It will be appreciated by those skilled in the art that changes could be made to the embodiments described above without departing from the broad inventive concept thereof. It is to be understood, therefore, that this invention is not limited to the particular embodiments disclosed, but it is intended to cover modifications within the spirt and scope of the present invention as defined by the appended claims.

I claim:

1. A baby formula preparation device comprising:
   a reservoir assembly that includes:
      a dry powder reservoir for holding baby formula,
      a water reservoir,
      a heating element for heating water within the water reservoir,
      a dry powder metering device connected to the dry powder reservoir for supplying a predetermined quantity of dry powder, and
      a water metering device connected to the water reservoir for supplying a predetermined quantity of heated water based on the predetermined quantity of dry powder,
   a mixing chamber operatively in communication with the dry powder reservoir and water reservoir for mixing the predetermined quantity of dry powder and the predetermined quantity of heated water together to form a formula mixture, the mixing chamber including a nozzle for dispensing the formula mixture into a baby bottle;
   a dispensing area for receiving the baby bottle, the dispensing area adjacent to and below the mixing chamber;
   a heating chamber adjacent the dispensing area for heating a food container; and
   a control unit operably connected to the reservoir assembly, mixing chamber, and heating chamber, and configured to automatically dispense the formula mixture.

2. The baby formula preparation device of claim 1, wherein the heating chamber includes:
   a heating cavity having walls formed by the reservoir assembly and dispensing area;
   a heating plate; and
   a door moveable between an open position for accessing the heating chamber and a closed position for sealing the heating chamber.

3. The baby formula preparation device of claim 1, wherein the heating chamber includes:
   a heating cavity adapted to receive the food container; and
   a heating apparatus for heating the heating cavity.

4. The baby formula preparation device of claim 1, wherein the water reservoir is connected to a water supply line coupled to the water reservoir for connection to an external water supply.

5. The baby formula preparation device of claim 1, wherein the nozzle includes a filter for preventing clumps of formula mixture from being dispensed into the baby bottle.

6. The baby formula preparation device of claim 1, wherein the control unit is operably connected to the dry powder metering device and the water metering device, and configured to supply a quantity of dry powder based on a size of the baby bottle.

7. The baby formula preparation device of claim 1, wherein the water reservoir surrounds the heating chamber to heat the heating chamber.

8. The baby formula preparation device of claim 1, wherein the dispensing area includes a drip tray for catching any overflow of formula mixture.

9. The baby formula preparation device of claim 1, wherein the water reservoir operably connected to the dry powder metering device, and configured to select a predetermined quantity of dry powder.

10. The baby formula preparation device of claim 1, wherein the heating element is a coiled heating element.

* * * * *